US008799417B2

(12) United States Patent
Pearce

(10) Patent No.: US 8,799,417 B2
(45) Date of Patent: Aug. 5, 2014

(54) SYSTEM AND METHOD FOR CUSTOMIZING SETTINGS IN A COMMUNICATION DEVICE FOR A USER

(75) Inventor: Catherine M. Pearce, Stilwell, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 669 days.

(21) Appl. No.: 12/109,264

(22) Filed: Apr. 24, 2008

(65) Prior Publication Data
US 2009/0271503 A1 Oct. 29, 2009

(51) Int. Cl.
*G06F 15/177* (2006.01)

(52) U.S. Cl.
USPC ............ 709/220; 709/221; 709/228; 709/229; 370/254; 455/125; 455/213; 455/214; 455/218; 455/219; 455/220

(58) Field of Classification Search
USPC .......... 709/201, 229, 220, 221, 228; 455/466, 455/418, 565, 566, 125, 213, 214, 455/218–220; 370/254
See application file for complete search history.

(56) References Cited

U.S. PATENT DOCUMENTS

| | | | |
|---|---|---|---|
| 5,696,965 A | 12/1997 | Dedrick | |
| 6,338,066 B1 | 1/2002 | Martin et al. | |
| 7,248,835 B2 * | 7/2007 | Fan et al. | 455/63.1 |
| 7,284,033 B2 * | 10/2007 | Jhanji | 709/206 |
| 7,301,463 B1 * | 11/2007 | Paterno | 340/573.1 |
| 7,640,336 B1 | 12/2009 | Lu et al. | |
| 8,428,732 B2 * | 4/2013 | Nishida et al. | 607/45 |
| 8,441,356 B1 * | 5/2013 | Tedesco et al. | 340/573.1 |
| 8,494,507 B1 * | 7/2013 | Tedesco et al. | 455/418 |
| 8,553,849 B2 * | 10/2013 | Michaelis et al. | 379/52 |
| 8,561,884 B2 * | 10/2013 | Jimenez Alamo | 235/375 |
| 8,566,164 B2 | 10/2013 | Shkedi et al. | |
| 8,669,864 B1 * | 3/2014 | Tedesco et al. | 340/539.12 |
| 2002/0111796 A1 * | 8/2002 | Nemoto | 704/205 |
| 2003/0093217 A1 * | 5/2003 | Petzold et al. | 701/201 |
| 2003/0097262 A1 * | 5/2003 | Nelson | 704/235 |
| 2004/0198385 A1 * | 10/2004 | Wheeler et al. | 455/456.1 |
| 2004/0203349 A1 * | 10/2004 | Detweiler et al. | 455/41.1 |
| 2004/0225504 A1 * | 11/2004 | Junqua et al. | 704/275 |
| 2004/0249855 A1 * | 12/2004 | Detweiler et al. | 707/104.1 |
| 2005/0021784 A1 * | 1/2005 | Prehofer | 709/229 |
| 2005/0101250 A1 * | 5/2005 | Helal et al. | 455/41.2 |
| 2006/0047725 A1 * | 3/2006 | Bramson | 707/204 |
| 2006/0178932 A1 * | 8/2006 | Lang | 705/14 |

(Continued)

OTHER PUBLICATIONS

U.S. Appl. No. 12/112,674; Non-Final Rejection dated Oct. 19, 2012; 28 pages.

(Continued)

*Primary Examiner* — Thu Ha Nguyen
(74) *Attorney, Agent, or Firm* — Swanson & Bratschun, L.L.C.

(57) ABSTRACT

The illustrative embodiments described herein provide a method, apparatus, and computer program product for customizing settings in a communication device for a user. In one illustrative embodiment, the process identifies a user profile to which a user belongs. The process identifies a set of custom communication device settings associated with the user profile. The process also sets a current set of communication device settings for a set of functions in a communication device to the set of custom communication device settings. In one embodiment, identifying the user profile to which the user belongs includes identifying the user profile to which the user belongs based on one or more characteristics of the user.

21 Claims, 4 Drawing Sheets

(56) References Cited

U.S. PATENT DOCUMENTS

| | | | |
|---|---|---|---|
| 2006/0217111 A1* | 9/2006 | Marolia et al. | 455/418 |
| 2007/0071264 A1* | 3/2007 | Baechler et al. | 381/315 |
| 2007/0244750 A1 | 10/2007 | Grannan et al. | |
| 2008/0020803 A1* | 1/2008 | Rios et al. | 455/565 |
| 2008/0065759 A1 | 3/2008 | Gassewitz et al. | |
| 2008/0102899 A1* | 5/2008 | Zhang et al. | 455/566 |
| 2008/0134045 A1* | 6/2008 | Fridman et al. | 715/735 |
| 2008/0155118 A1* | 6/2008 | Glaser et al. | 709/238 |
| 2008/0175372 A1* | 7/2008 | Brunet et al. | 379/265.09 |
| 2009/0082045 A1* | 3/2009 | Mitchell et al. | 455/466 |
| 2009/0131020 A1* | 5/2009 | van de Groenendaal | 455/411 |
| 2009/0133090 A1* | 5/2009 | Busse | 725/132 |
| 2009/0157658 A1 | 6/2009 | Bonev et al. | |
| 2009/0271503 A1* | 10/2009 | Pearce | 709/220 |
| 2009/0276801 A1 | 11/2009 | Reece | |
| 2010/0076950 A1* | 3/2010 | Kenedy et al. | 707/706 |
| 2010/0169154 A1* | 7/2010 | Kraft et al. | 705/10 |
| 2010/0217600 A1* | 8/2010 | Lobzakov | 704/260 |
| 2010/0225493 A1* | 9/2010 | Zishaan | 340/627 |
| 2011/0236872 A1* | 9/2011 | Taylor | 434/350 |
| 2011/0289317 A1* | 11/2011 | Darapu et al. | 713/168 |
| 2012/0083958 A1* | 4/2012 | Ballard | 701/22 |
| 2013/0189963 A1* | 7/2013 | Epp et al. | 455/414.1 |
| 2013/0191250 A1* | 7/2013 | Bradley et al. | 705/26.61 |

OTHER PUBLICATIONS

Fang, Yu, "High Speed Deep Packet Inspection with Hardware Support", Fall 2006, 214 pages.

U.S. Appl. No. 12/112,674; Final Rejection dated Jul. 21, 2011; 22 pages.

U.S. Appl. No. 12/112,674; Non-Final Rejection dated Mar. 29, 2011; 21 pages.

U.S. Appl. No. 12/112,674; Non-Final Rejection dated Jun. 8, 2012; 30 pages.

U.S. Appl. No. 12/112,674; Final Rejection dated Dec. 2, 2013; 30 pages.

U.S. Appl. No. 12/112,674; Final Rejection dated Feb. 14, 2013; 30 pages.

U.S. Appl. No. 12/112,674; Non-Final Rejection dated Aug. 14, 2013; 27 pages.

U.S. Appl. No. 12/112,674; Notice of Panel Decision from Pre-Appeal Brief Review dated Jun. 25, 2013; 2 pages.

U.S. Appl. No. 12/112,674; Non-Final Rejection dated Mar. 13, 2014; 35 pages.

* cited by examiner

SYSTEM AND METHOD FOR CUSTOMIZING SETTINGS IN A COMMUNICATION DEVICE FOR A USER

BACKGROUND OF THE INVENTION

1. Field of the Invention

The present invention relates generally to a method and apparatus for customizing settings in a communication device. More particularly, the present invention relates to a method and apparatus for customizing settings in a communication device for a user.

2. Description of the Related Art

Communication devices are now commonly used in a wide variety of commercial, governmental, and personal applications. A communication device is any device capable of communicating with a user or another device. Non-limiting examples of communication devices include phones, including landline and cellular phones, walkie talkies, personal computers, personal digital assistants, music players, and laptop computers. Communication devices allow a user to execute a wide variety of applications, including executing voice calls, text messaging, internet browsing, music playback, memo recording, personal organization functions, e-mail, instant messaging, camera and camcorder applications, radio reception, video games, and modem functions for other devices.

Communication devices typically include a variety of functions that may be set to a particular setting. For example, a cellular phone has a variety of functions, such as ringer type, speaker volume, and background display brightness, that may be customized by a user. However, current methods for customizing settings for communication devices require that a user manually set each of the communication device functions to a desired setting. Because a communication device may have dozens or even hundreds of customizable settings, manually setting each communication device function to a desired setting is a laborious and time-consuming process. In addition, discovering how to initialize or change a setting for a particular function can be a difficult process, especially for users that are not familiar or comfortable with current communication device interface systems. Thus, a user may be prevented from customizing a setting at all.

Widely varied segments of the population use communication devices. For example, communication devices are used by people of all ages, from children to senior citizens. Communication devices are also used by people that have special needs, such as disabled or handicapped people. Current methods for customizing settings for communication devices do not take into account characteristics of particular segments of the population to facilitate initiating or changing settings for a communication device. Thus, these population segments are forced to manually initialize or change settings in communication devices to suit their particular needs, despite having needs that are common to others in their population segment.

BRIEF SUMMARY OF THE INVENTION

To alleviate one or more of the existing problems with customizing settings in a communication device, the illustrative embodiments described herein are directed to a data processing system and, in particular, to a method and system for customizing settings in a communication device. More particularly, the illustrative embodiments are directed to a method, system, and computer-usable program code for customizing settings in a communication device for a user belonging to a user profile. In one illustrative embodiment, the process identifies a user profile to which a user belongs. The process identifies a set of custom communication device settings associated with the user profile. The process also sets a current set of communication device settings for a set of functions in a communication device to the set of custom communication device settings. In one embodiment, identifying the user profile to which the user belongs includes identifying the user profile to which the user belongs based on one or more characteristics of the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
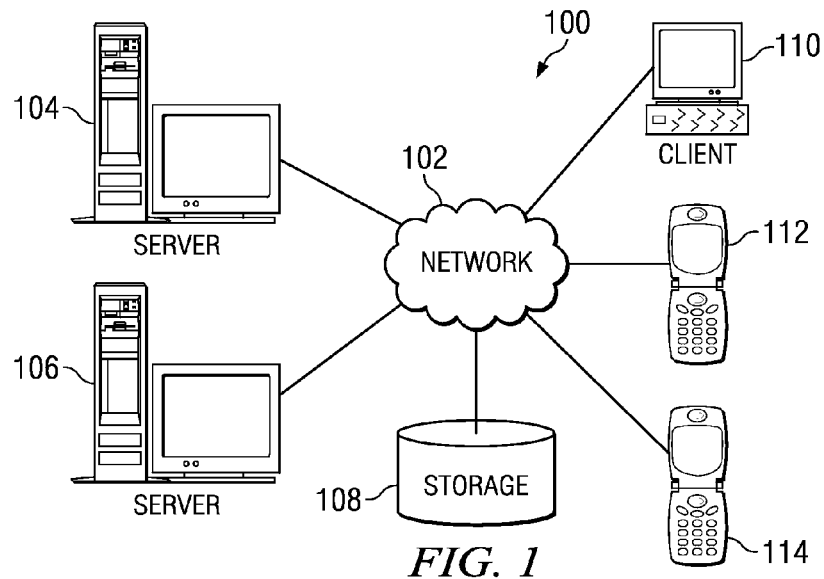
FIG. 1 is a pictorial representation of a network data processing system in which the illustrative embodiments of the present invention may be implemented.
Figure 2:
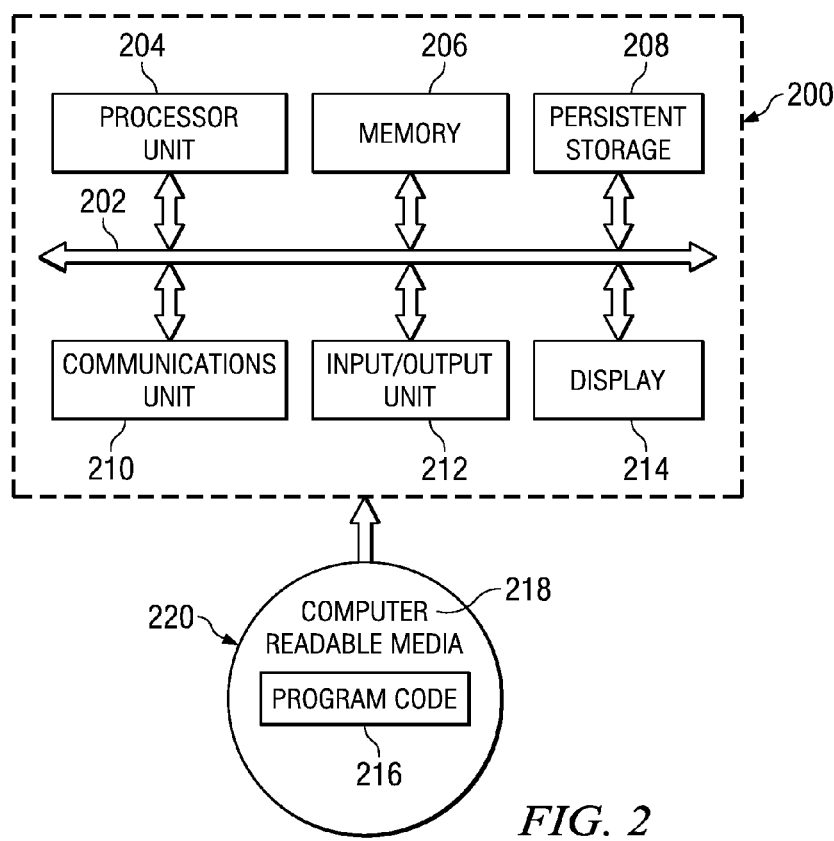
FIG. 2 is a block diagram of a data processing system in which the illustrative embodiments of the present invention may be implemented.

With reference now to the figures and in particular with reference to FIGS. 1 and 2, diagrams of data processing environments are provided in which illustrative embodiments may be implemented. It should be appreciated that FIGS. 1 and 2 are only examples and are not intended to assert or imply any limitation with regard to the environments in which different embodiments may be implemented. Many modifications to the depicted environments may be made.

FIG. 1 depicts a pictorial representation of a network of data processing systems 100 in which illustrative embodiments may be implemented. Network data processing system 100 is a network of computers in which the illustrative embodiments may be implemented. Network data processing system 100 contains a network 102, which is the medium used to provide communication links between various devices and computers connected together within network data processing system 100. Network 102 may include connections, such as wire, wireless communication links, or fiber optic cables. In one example, network 102 is an Over the Air network that may be used by phone service providers to transmit data.

In the depicted example, a server 104 and a server 106 connect to network 102 along with a storage unit 108. In addition, clients 110, 112, and 114 connect to network 102. Clients 110, 112, and 114 may be any communication devices. In the example of FIG. 1, clients 112 and 114 are cellular phones. In this example, network 102 may provide a wireless communications network that allows clients 110, 112, and 114 to communicate with one another. The wireless communications network, including servers 104 and 106, may be managed by a service provider. In the depicted example, server 104 may provide data, such as boot files and applications to clients 110, 112, and 114. In another example, servers 104 may deploy or provide an application 115 for customizing settings for functions of clients 110, 112, and 114. Application 115 for customizing settings may also be located on servers 104 and 106 such that setting may be customized on clients 110, 112, and 114 without the need to deploy the application to clients 110, 112, and 114.

Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. For example, network data processing system 100 may be implemented as any network that may be used to facilitate communication between communication devices, including a CDMA network such as cdmaOne or CDMA2000.

With reference now to FIG. 2, a block diagram of a data processing system 200 is shown in which illustrative embodiments may be implemented. Data processing system 200 is an example of a communication device or computer, such as server 104 or clients 110, 112, and 114 in FIG. 1, in which computer-usable program code or instructions implementing the processes may be located for the illustrative embodiments. In one non-limiting example, data processing system 200 may be a cellular phone. Data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Memory 206 may store the assigned value of a variable. For example, memory 206 may contain the value given to a variable in a variable assignment. These values may also be contained in registers that are included in memory 206.

Communications unit 210, in these examples, provides for communications with other data processing systems or communication devices. In these examples, communications unit 210 is a network interface card. Communications unit 210 may provide communications through the use of either or both physical and wireless communication links.

Input/output unit 212 allows for the input and output of data with other devices that may be connected to data processing system 200. For example, input/output unit 212 may provide a connection for user input through a keyboard and mouse. Further, input/output unit 212 may send output to a printer. In the case in which data processing system 200 is a cellular phone, input/output unit 212 may also allow devices to be connected to the cellular phone, such as microphones, headsets, and controllers. Display 214 provides a mechanism to display information to a user. In the case in which data processing system 200 is a cellular phone, display 214 may be a graphical user interface on the cellular phone.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one embodiment, computer program product 220 is a computer program product for customizing settings in a communication device for a user in accordance with an illustrative embodiment.

In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer recordable storage media.

Alternatively, program code 216 may be transferred to data processing system 200 from computer-readable media 218 through a communication link to communications unit 210 and/or through a connection to input/output unit 212. The communication link and/or the connection may be physical or wireless in the illustrative examples. The computer-readable media also may take the form of non-tangible media, such as communication links or wireless transmissions containing the program code. In the example in which data processing system 200 is a cellular phone, program code 216 may be deployed to the cellular phone via over the air programming, the Internet, or Bluetooth, either of which may use network 102.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer-implemented method, apparatus, and computer program product for customizing settings in a communication device for a user. In one illustrative embodiment, the process identifies a user profile to which a user belongs. A user profile is a category of users having at least one common characteristic. In one example, the process may identify the user profile to which the user belongs based on one or more characteristics of the user. As further described herein, non-limiting examples of the characteristics that may be used to identify the user profile to which the user belongs include age, gender, user interest in a topic, or the presence of a disability, such as hearing impairment. Also, the identification of the user profile to which a user belongs may be based on a user selection. The user selection may indicate the user profile, or may indicate characteristics of the user that may be used to identify the user profile of the user.

In some cases, a user may belong to two or more user profiles based on that user's characteristics. In this case, the process may identify a hybrid user profile to which the user belongs based on at least two characteristics of the user. A hybrid user profile is a user profile that includes elements of two or more other user profiles.

The process identifies a set of custom communication device settings associated with the user profile or hybrid user profile. The set of custom communication device settings includes one or more custom communication device settings. A communication device setting is any value, option, parameter, toggle value, or selection associated with a function of a communication device. A function is any capability of the communication device. A custom communication device setting is any communication device setting that is assigned to, programmed to, or otherwise associated with a user profile or hybrid user profile. The set of custom communication device settings may be a user-defined set of custom communication device settings.

The process also sets a current set of communication device settings for a set of functions in a communication device to the set of custom communication device settings. The current set of communication device settings includes one or more communication device settings. The set of functions includes one or more functions. In one example, setting the current set of communication device settings for the set of functions in the communication device to the set of custom communication device settings includes changing the current set of communication device settings for the set of functions in the communication device to the set of custom communication device settings in response to determining that the current set of communication device settings do not match the set of custom communication device settings.

Figure 3:
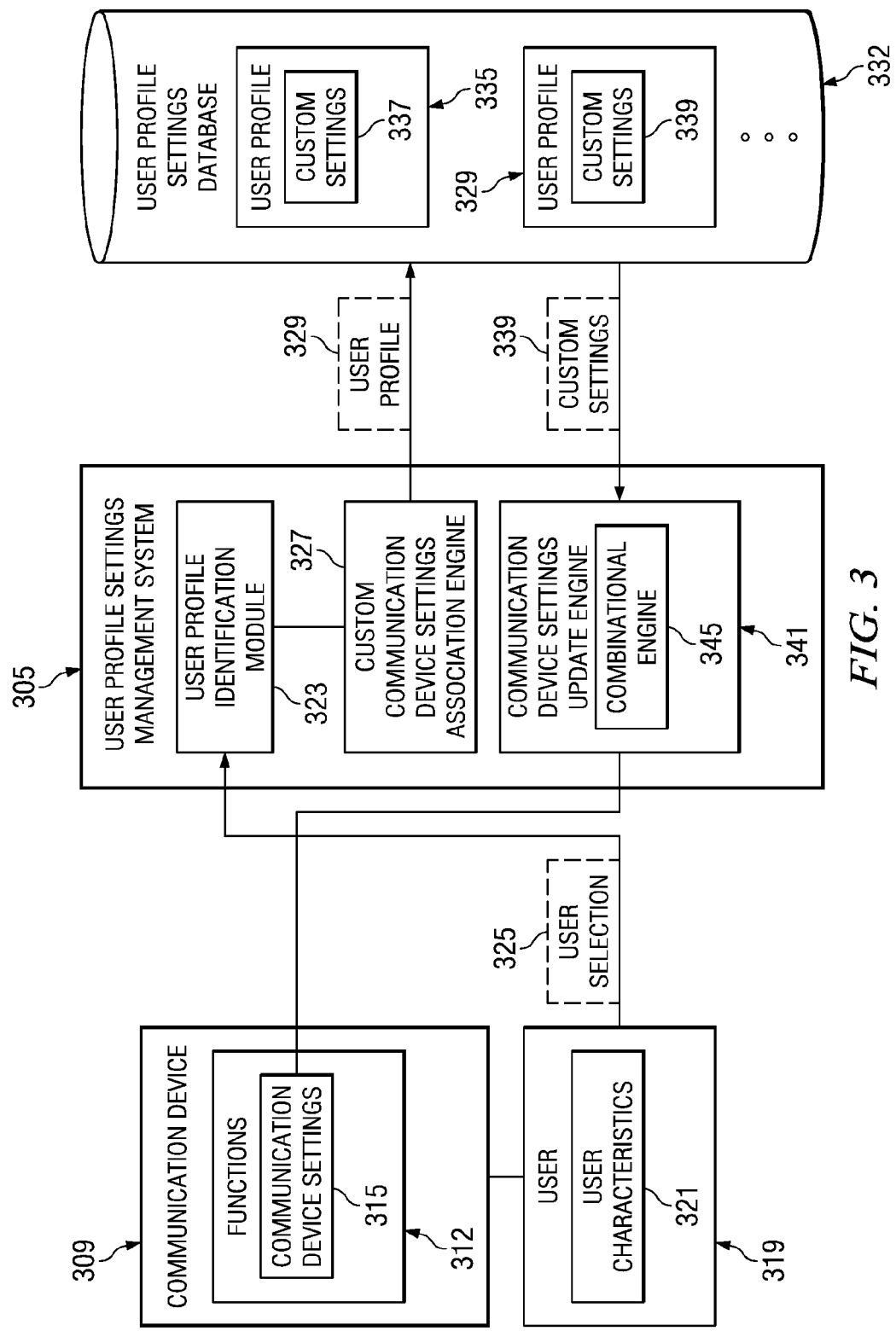
FIG. 3 is a block diagram of a user profile settings management system for customizing settings in a communication device for a user in accordance with an illustrative embodiment.

Turning now to FIG. 3, a block diagram of a user profile settings management system for customizing settings in a communication device for a user is depicted in accordance with an illustrative embodiment. Specifically, FIG. 3 shows user profile settings management system 305, which may be implemented in data processing system 100 in FIG. 1 or data processing system 200 in FIG. 2.

User profile settings management system 305 may be used to customize settings for the functions of communication device 309, such as a cellular phone. Communication device 309 has one or more functions 312. Functions 312 includes any of the selectable options that are available on communication device 309. Non-limiting examples of functions that may be included in function 312 of communication device 309 include a ringer type, a speaker volume, a font size, a backlight duration, a call answer mode, a ringer volume, a clock mode, incoming call display type, a menu mode, a key selection mode, and a background display type. The ringer type is the type of ringer on communication device 309, such as the sound or song that plays to alert a user of an event, such as an incoming call. The ringer type may also include whether communication device 309 vibrates in response to an event, and the intensity at which communication device 309 vibrates. The speaker volume is the loudness of the speaker of communication device 309. The font size is the size of the font displayed on a graphical user interface of communication device 309. The backlight duration is the length of time that a backlight is illuminated on any part of communication device 309, such as the graphical user interface portion of communication device 309.

The call answer mode is the mode in which calls are answered using communication device 309. For example, the call answer mode may be set to a mode in which a call is answered by pressing a button or flipping or moving a portion of communication device 309. The ringer volume is the volume of the ringer of communication device 309. The clock mode is the mode of the clock of communication device 309. For example, the clock mode may be set to an analog or digital display type. The incoming call display mode determines which operations are performed when an incoming call is received. For example, in one incoming call display mode, the graphical user interface may display a certain color or icon when an incoming call is received.

The menu mode is the mode of the menu of a graphical user interface of communication device 309. For example, depending on the menu mode, options on a graphical user interface of the communication device 309 may be displayed in an icon or list view. The key selection mode determines an operation, if any, in response to a key selection on communication device 309, such as whether the communication device 309 makes a sound when a key is pressed. The background display type is the type of background display on a graphical user interface of the communication device 309.

Communication device 309 is not limited to these exemplary functions of functions 312. Functions 312 also includes any selectable option or feature of communication device 309, and includes those options or features that may be set by a user or another device.

Each of functions 312 may have one or more respective settings in communication device settings 315. Communication device settings 315 are the particular settings to which functions 312 are set at any given time. In one example, communication device settings 315 have not yet been determined, and, thus, functions 312 need to be initialized to have particular settings.

User 319 is associated with communication device 309. For example, user 319 may be an owner or operator of communication device 309. User 319 has one or more user characteristics 321. User characteristics 321 may include any characteristic, attribute, or description of user 319. For example, user characteristics may include an age, disability status, type of disability, gender, eye color, ethnicity, occupation, level of education, organizational memberships, attended education institutions, traveling patterns, whether the user is a global traveler, religious preferences, or place of residence of user 319. User characteristics 321 may also includes one or more topics of interest to user 319. As explained further below, user 319 may categorized into one or more user profiles based on characteristics of the user 319 so that the communication device settings of functions 312 are customized for user 319.

User profile settings management system 305 may be programmed using any programming language to form any type of application. Thus, each of the functions of user profile settings management system 305 may be implemented by an application, which may be included in communication device 309. In one example, user profile settings management system 305 may be an applet. In another example, user profile settings management system 305 may be a Java application that is developed on a Java platform. Other application platforms, such as BREW, could utilize user profile settings management system 305 as well.

Although user profile settings management system 305 is shown to be separate from communication device 309, user profile settings management system 305 may be stored in communication device 309, such as in memory 206 or persistent storage 208 in FIG. 2. User profile settings management system 305 may be transferred to communication device 309 in a variety of ways. For example, user settings management system 305 may be transferred to communication device 309 from a server, such as servers 104 and 106 in FIG. 1, using the Internet, Bluetooth, or over the air programming.

User profile settings management system 305 may also be stored in a device that is separate from communications device 309. For example, user profile settings management system 305 may be stored in a server, such as servers 104 and 106 in FIG. 1, or a storage device, such as storage device 108 in FIG. 1, that is connected to communication device 309.

User profile settings management system 305 includes user profile identification module 323. User profile identification module 323 identifies a user profile to which user 319 belongs.

In one example, user profile identification module 323 may identify a user profile to which user 319 belongs based on one or more of user characteristics 321. In one non-limiting example, user profile identification module 323 identifies the user profile to which user 319 belongs based on an age of user 319. In this example, user profile identification module 323 may identify a particular user profile to which user 319 belongs in response to the age of user 319 exceeding a predetermined threshold, such as 30, 50, 65, or any other age. Among the user profiles that may be identified in these non-limiting examples are a senior, active elderly, or middle age user profile. In another example, user profile identification module 323 may identify a particular user profile to which user 319 belongs in response to the age of user 319 being less than a predetermined threshold. Among the user profiles that may be identified in this non-limiting example are a child, tween, teen, or young adult user profile.

In addition to age, a user profile may be identified by any other characteristic in user characteristics 321. For example, user profile identification module 323 identifies the user profile to which user 319 belongs based on a disability of the user. Non-limiting examples of disabilities that may be used to identify a user profile include hearing impairment, vision impairment, and physical deformity.

In another example, user profile identification module 323 may identify a hybrid user profile to which user 319 belongs based on at least two characteristics in user characteristics 321. In this example, user 319 may belong to two or more user profiles, each of which is identified by user profile identification module 323. User profile identification module 323 then identifies a hybrid user profile to which user 319 belong based on the at least two user profiles identified by user profile identification module 323. For example, user profile identification module 323 identifies an "elderly/disabled" hybrid user profile for user 319 based on user 319's categorization into both the "elderly" and "disabled" user profile. In another non-limiting example, user profile identification module 323 identifies an "young adult/sports interest" hybrid user profile for user 319 based on user 319's categorization into both the "young adult" and "sports interest" user profile.

As explained below, the user profile or hybrid user profile identified by user profile identification module 323 may be used by user profile settings management system 305 to customize the settings in communication device 309 for user 319. Also, as explained below, the use of hybrid user profiles is only one of several ways that user profile settings management system 305 can take into account two or more characteristics of user 319 to customize settings in communication device 309 for user 319.

User profile identification module 323 may detect user characteristics 321 in a variety of ways. For example, user characteristics 321 may be sent to user profile settings management system 305 by user 319. In this example, user characteristics 321 may be inputted directly into communication device 309, which transmits user characteristics 321 to user profile settings management system 305. In another example, user characteristics 321 may be inputted by user 319 on a web page, which, in turn, transmits user characteristics 321 to user profile settings management system 305 over a network, such as network 102 in FIG. 1. User characteristics 321 may also be inputted by a person or device other than user 319. For example, user characteristics 321 may be inputted by a person associated with a service provider that services communication device 309 or a person associated with a manufacturer or seller of communication device 309.

In another example, the user profile or hybrid user profile to which user 319 belongs may be entered via user selection 325, which indicates the user profile or hybrid user profile to which user 319 belongs. For example, user selection 325 may indicate that user 319 belongs to a "senior" or "teenage" user profile. User selection 325 may be inputted directly into communication device 309, which transmits user selection 325 to user profile settings management system 305. For example, communication device 309 may include a button or menu selection on communication device 309's graphical user interface that allows user 319 to make a user selection, such as user selection 325. In another example, user selection 325 may be inputted by user 319 on a web page, which, in turn, transmits user selection 325 to user profile settings management system 305 over a network, such as network 102 in FIG. 1. User selection 325 may also be inputted by a person or device other than user 319. For example, user selection 325 may be inputted by a person associated with a service provider that services communication device 309 or a person associated with a manufacturer or seller of communication device 309.

User profile settings management system 305 also includes custom communication device settings association engine 327. Custom communication device settings association engine 327 identifies a set of custom communication device settings associated with a user profile. For example, custom communication device settings association engine 327 may identify a user profile that has been identified by user profile identification module 323, which is user profile 329 in the example of FIG. 3.

In the example in which user profile identification module 323 identifies a hybrid user profile based on two or more characteristic in user characteristics 321, custom communication device settings association engine 327 may also identify a set of custom communication device settings associated with a hybrid user profile. In this non-limiting example, user profile 329 may be a hybrid user profile. Also, custom communication device settings association engine 327 may identify custom communication device settings associated with any number of user profiles, including two or more user profiles.

In one embodiment, custom settings for communication device 309 are retrieved from user profile settings database 332. User profile settings database 332 is a database that contains data related to user profiles, including hybrid user profiles, and custom settings associated with those user profiles. User profile settings database 332 may be a separate database that communicates with either or both of communication device 309 or user profile settings management system 305 over a network, such as network 102 in FIG. 1. User profile settings database 332 may also be stored in either or both of communication device 309 or user profile settings management system 305. For example, user profile settings database 332 may be stored in a memory or persistent storage in communication device 309, such as memory 206 or persistent storage 208 in FIG. 2.

In the non-limiting example of FIG. 3, user profile settings database 332 includes data regarding multiple user profiles, including user profiles 329 and 335. User profile settings database 332 may include data about any number of user profiles. User profile settings database 332 also includes the custom settings associated with each of the user profiles. For example, user profile settings database 332 includes custom settings 337, which are associated with user profile 335, and custom settings 339, which are associated with user profile 329.

The custom settings in user profile settings database 332 may include settings for functions 315 of communication device 309 that are customized or tailored for the particular user profile to which they are associated. For example, in a case in which user profile 329 is an senior or elderly user profile, custom settings 339 may include settings for functions 315 of communication device 309 that facilitate the use of communication device 309 by senior or elderly users. In another example, in a case in which user profile 329 is a user profile for users that have an interest in sports or a particular topic, custom settings 339 may include settings for functions 315 of communication device 309 that facilitate the use of communication device 309 by users that have an interest in sports or the particular topic of interest. Additional examples of custom settings for particular user profiles will be provided below.

In one embodiment, the custom settings in user profile settings database 332 are user defined settings. For example, user 319 may determine the custom settings associated with one or more of the user profiles in user profile settings database 332. In another example, the custom settings associated with one or more of the user profiles in user profile settings database 332 may be determined by a device or someone other than user 319, such as a person associated with a service provider that services communication device 309 or a person associated with a manufacturer or seller of communication device 309. In these examples, the custom settings in user profile settings database 332 may be determined by inputting the setting via any device, such as communication device 309 or a separate data processing system, such as any of servers 104 and 106 or clients 110, 112, or 114 in network data processing system 100 in FIG. 1.

In the non-limiting example of FIG. 3, custom communication device settings association engine 327 retrieves custom settings 339 for user profile 329, which the user profile identified by user profile identification module 323. Custom settings 339 may then be sent to communication device settings update engine 341, which is included in user profile settings management system 305. In one embodiment, communication device settings update engine 341 sets communication device settings 315 for functions 312, which may be the current settings for functions 312 of communication device 309, to the custom settings associated with the user profile to which user 319 belongs, which is user profile 329 in the example of FIG. 3. In particular, in the example of FIG. 3, communication device settings update engine 341 sets communication device settings 315 to custom settings 339.

In one embodiment, in the event that communication device settings 315 match custom settings 339, communication device settings update engine 341 may refrain from setting communication device settings 315 to custom settings 339. On the other hand, in response to determining that communication device settings 315 do not match custom settings 339, communication device settings update engine 341 may change communication device settings 315 to custom settings 339.

In the example in which user profile settings management system 305 is not located on communication device 309, communication device settings update engine 341 may set communication device settings 315 over a wired or wireless link. For example, communication device settings update engine 341 may set communication device settings 315 using the Internet, Over the Air programming, Bluetooth, or network 100 in FIG. 1.

Communication device settings update engine 341 includes combinational engine 345. Combinational engine 345 receives custom settings for two or more user profiles and determines a hybrid set of custom settings in combinational engine 345. Combinational engine 345 may combine the separate sets of custom settings using a variety of techniques, such as combination logic programmed into combinational engine 345, a data matrix, a predefined algorithm, or a database that includes hybrid sets of custom settings for any combination of custom settings corresponding to two or more user profiles. For example, in a case in which user 319 belongs to both a teenage user profile and an arts interest user profile, the custom settings that are received by combinational engine 345 may be combined to form a hybrid set of custom settings that reflect both the teenage and art interest user profiles. Communication device settings update engine 341 may then set communication device settings 315 to the hybrid set of custom settings determined by combination engine 345. Thus, using combinational engine 345, user 319 may belong to any number of user profiles, and functions 312 in communication device 309 may be set to custom settings that reflect the user profiles to which user 319 belongs.

Thus, the illustrative embodiments enable a user to more easily customize settings for functions of a communication device, such as a cellular phone. Non-limiting examples are now given to describe the customizing of settings for communication device 309 in accordance with the illustrative embodiments. In a first non-limiting example, user profile identification module 323 identifies that user 319 belongs to a tween user profile. In this example, the tween user profile may be a profile assigned to users between the ages of 9-12, and communication device 309 may be a cellular phone, such as the Katana II model from Sanyo®. Custom settings 339 associated with the tween user profile may then be applied to communication device settings 315 for functions 312 by communication device settings update engine 341. For example, the font size may be set to large for both input and view fonts, the clock mode may be set to "Digital clock 3 (white)" on the sub LCD display screen and main display, the incoming call display type may be set to claret pink, the up navigation key may be set to a send text function, the right navigation key may initiate a contacts function, the left navigation key may be set to initiate a web function, the down navigation key may be set to initiate a pictures function, the menu mode or view of the graphical user interface may be set to a grid view to show icons, the ringer type may be set to the song "Ten Little Indians," and the key selection mode may be set to have a key beep at a volume of "3." These functions may also be set to any other settings, and other functions not included in this example may be set by communication device settings update engine 341.

In a second non-limiting example, user profile identification module 323 identifies that user 319 belongs to a senior or active elderly user profile. In this example, the senior or active elderly user profile may be a profile assigned to users having an age over a predefined threshold, such as 65, and communication device 309 may be a cellular phone, such as the Katana II model from Sanyo®. Custom settings 339 associated with the senior or active elderly user profile may then be applied to communication device settings 315 for functions 312 by communication device settings update engine 341. For example, the font size may be set to large for both input and view fonts, the earpiece and speakerphone volume may be set to high, 6 out of 8, or 4 out of 5, the call answer mode may be set to answer when the phone is flipped open and set to release the call when the flip is closed, the clock mode may be set to "Digital clock 2 (green)" or a large digital clock on the sub LCD display screen and main display, the backlight duration may be set to 30 seconds, the key backlight may be set to 30 seconds, the sub LCD backlight duration may be set to 20 seconds, and the menu mode or view of the graphical user interface may be set to a list view.

Although FIG. 3 shows only one user 319 for communication device 309, communication device 309 may be used by any number of users. In one embodiment, each of the users of communication device 309 may belong to one or more user profiles. In this embodiment, user profile settings management system 305 may include a separate module that allows the users of communication device 309 to switch between custom settings associated with each of the user profiles to which each respective user belongs. For example, in a case in which two users of communication device 309 belong to a disabled and a tween user profile, respectively, one of the users may switch between user profiles such that communication device 309 includes the settings that pertain to the current user. In one example, communication device 309 may prompt a current user for a code or password, each code or password belonging to a different user of communication device 309. In this example, communication device 309 may set communication device settings 315 to the custom settings associated with the user to which the entered code or password belong. For example, if in the previous example the user that belongs to the tween user profile enters his or her password into communication device 309, communication device settings 315 may be set to the custom settings associated with a tween user profile, as determined by user profile settings management system 305. Communication device 309 may also make available the phone number listing associated to the current user so that the current user is only able to access phone numbers in their respective phone books. In other examples, communication device 309 may detect the current user by methods other than code or password entry, such as voice recognition.

In another embodiment, user profile settings management system 305 may deploy computer readable code for customizing communication device settings 315 in communication device 309 for a customer. In this embodiment, a data processing system, such as any of servers 104 and 106, clients 110, 112, or 114, or storage 108 in FIG. 1, may receive a set of parameters about a customer. In one example, the customer is user 319. The set of parameters includes one or more parameters. A parameter is any data that pertains to the customer, including but not limited to name, age, birthplace, address, phone number, interests, disabled status, or specific disabilities. The set of parameters may also include data about communication device 309, such as type, model, or brand, serial number, or capabilities of the communication device. In one example, the set of parameters may be indicated by user selection 325. In another example, receiving the set of parameters about the customer includes receiving the set of parameters about the customer from the customer via an Internet website. The set of parameters may also be received via Bluetooth, network 100 in FIG. 1, or communication device 309. In another example, the set of parameters about the customer are not sent or inputted by the customer. In this example, the set of parameters may be sent or inputted by a person associated with a service provider that services communication device 309 or a person associated with a manufacturer or seller of communication device 309.

A data processing system, such as any of servers 104 and 106, clients 110, 112, or 114, or storage 108 in FIG. 1, may identify a communication device application for use in response to receiving the set of parameters to form an identified communication device application. In one example, the identified communication device application is user profile settings management system 305, as described in the illustrative embodiments. The identified communication device application may be a Java application. The identified communication device application may include computer usable program code capable of identifying a user profile to which the customer belongs, identifying a set of custom communication device settings associated with the user profile, and setting communication device settings 315 for functions 312 in communication device 309 to the set of custom communication device settings when the computer usable program code is deployed in communication device 309.

Upon identifying the identified communication device application, the identified communication device application may then be deployed to communication device 309. The identified communication device application may be deployed in a variety of ways. For example, deploying the identified communication device application to communication device 309 may include deploying the identified communication device application to communication device 309 via Internet, Bluetooth, or Over the Air programming. In another example, the identified communication device application may be deployed at a retail store by an employee of the service provider for communication device 309. In this example, a clerk at the retail store may deploy the identified communication device application from a computer at the retail store via a universal serial bus, or USB, connection.

Figure 4:
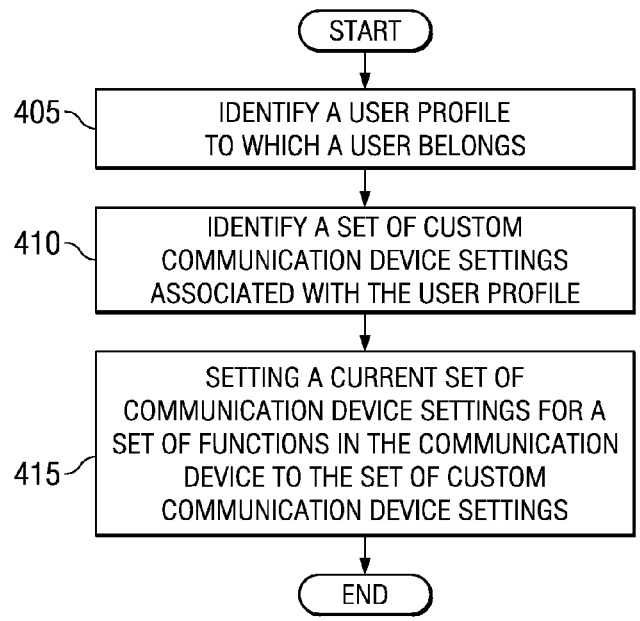
FIG. 4 is a flowchart illustrating a process for customizing settings in a communication device for a user in accordance with an illustrative embodiment.

Turning now to FIG. 4, a flowchart illustrating a process for customizing settings in a communication device for a user is depicted in accordance with an illustrative embodiment. In one embodiment, the process shown in FIG. 4 may be implemented by a user profile settings management system, such as user profile settings management system 305 in FIG. 3.

The process begins by identifying a user profile to which a user belongs (step 405). The process identifies a set of custom communication device settings associated with the user profile (step 410). The process sets a current set of communication device settings for a set of functions in the communication device to the set of custom communication device settings (step 415).

Figure 5:
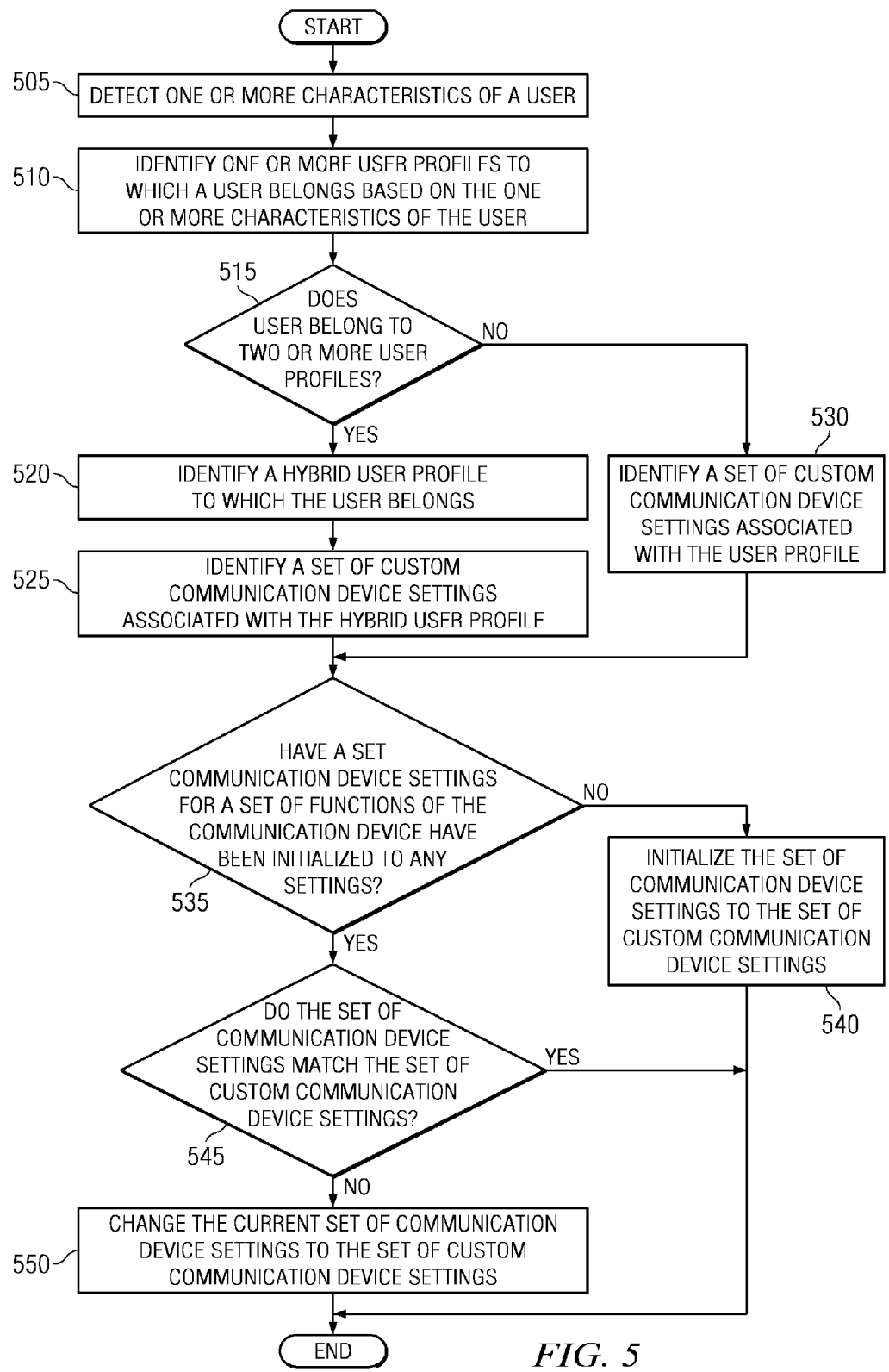
FIG. 5 is a flowchart illustrating a process for customizing settings in a communication device for a user in accordance with an illustrative embodiment.

Turning now to FIG. 5, a flowchart illustrating a process for customizing settings in a communication device for a user is depicted in accordance with an illustrative embodiment. The process shown in FIG. 5 shows non-limiting examples of additional steps associated with steps 405, 410, and 415 in FIG. 4. In one embodiment, the process shown in FIG. 5 may be implemented by a user profile settings management system, such as user profile settings management system 305 in FIG. 3.

The process begins by detecting one or more characteristics of a user (step 505). The process identifies one or more user profiles to which a user belongs based on the one or more characteristics of the user (step 510). The process determines whether the user belongs to two or more user profiles (step 515). If the process determines that the user belongs to two or more user profiles, the process identifies a hybrid user profile to which the user belongs (step 520). The process then identifies a set of custom communication device settings associated with the hybrid user profile (step 525). The process then proceeds to step 535.

Returning to step 515, if the process determines that the user does not belong to two or more user profiles, the process identifies a set of custom communication device settings associated with the user profile (step 530). The process determines whether a set of communication device settings for a set of functions of the communication device have been initialized to any settings (step 535). If the process determines that the set of communication device settings for a set of functions of the communication device have not been initialized to any settings, the process initializes the set of communication device settings to the set of custom communication device settings (step 540). The process then terminates.

Returning to step 535, if the process determines that the set of communication device settings for a set of functions of the communication device have been initialized to any settings, the process determines whether the set of communication device settings match the set of custom communication device settings (step 545). If the process determines that the set of communication device settings match the set of custom communication device settings, the process terminates.

Returning to step 545, if the process determines that the set of communication device settings do not match the set of custom communication device settings, the process changes the current set of communication device settings to the set of custom communication device settings (step 550). The process then terminates.

Figure 6:
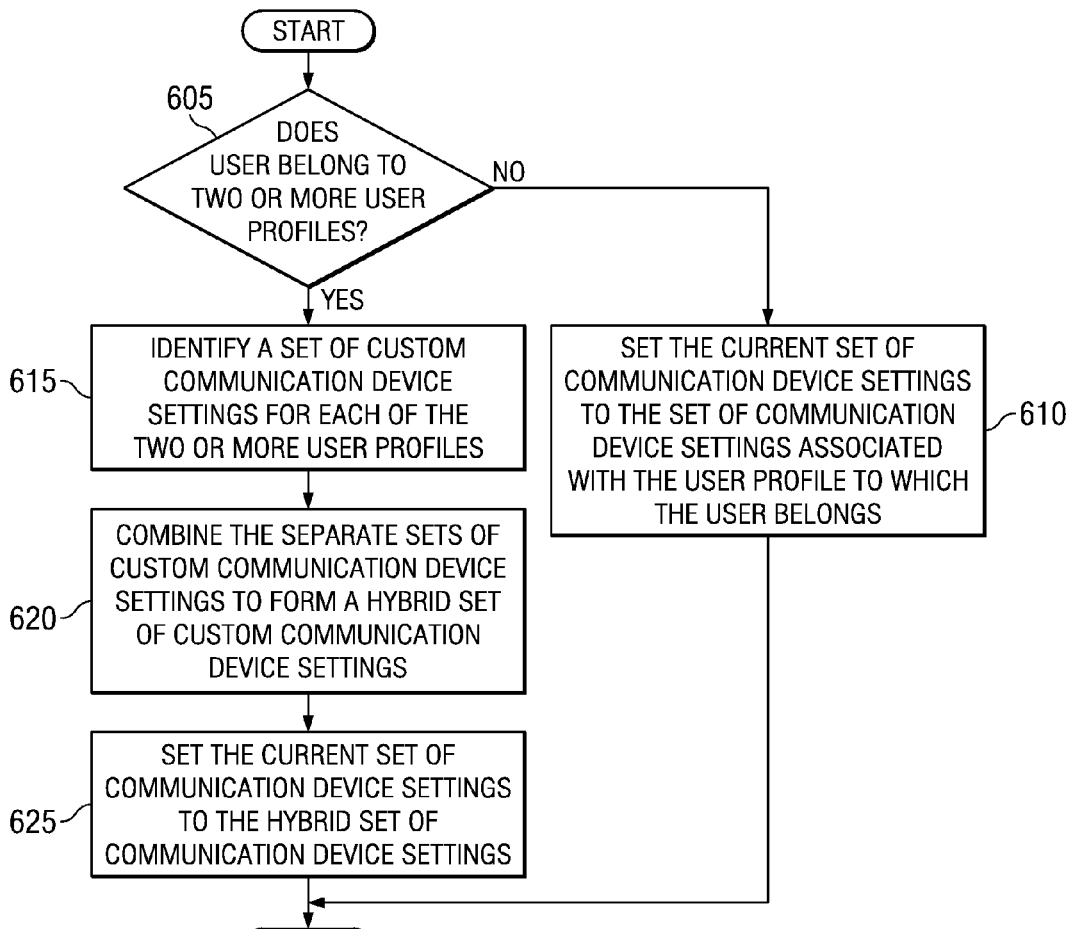
FIG. 6 is a flowchart illustrating a process for customizing settings in a communication device for a user in accordance with an illustrative embodiment.

Turning now to FIG. 6, a flowchart illustrating a process for customizing settings in a communication device for a user is depicted in accordance with an illustrative embodiment. The process shown in FIG. 6 shows non-limiting examples of additional steps associated with steps 515, 530, and 550 in FIG. 5. In one embodiment, the process shown in FIG. 6 may be implemented by a user profile settings management system, such as user profile settings management system 305 in FIG. 3.

The process begins by determining whether the user belongs to two or more user profiles (step 605). If the process determines that the user does not belong to two or more user profiles, the process sets the current set of communication device settings to the set of communication device settings associated with the user profile to which the user belongs (step 610). The process then terminates.

Returning to step 605, if the process determines that the user belongs to two or more user profiles, the process identifies a set of custom communication device settings for each of the two or more user profiles (step 615). The process combines the separate sets of custom communication device settings to form a hybrid set of custom communication device settings (step 620). The process sets the current set of communication device settings to the hybrid set of communication device settings (step 625). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The illustrative embodiments described herein allow for settings to be customized on a communication device regardless of the network that the communication device is a part. In particular, by using the illustrative embodiments, settings may be customized for any communication device that has one or more settings that may be manually customized by a user. Further, the illustrative embodiments may be used to customize settings without the need for a user to manually customize the settings, and without the need for a user to manually install an application on the communication device. For example, changing the settings of the communication device may be initiated by receiving user input on a website, input from a customer service representative, or a push of a button on the communication device. In these examples, the input may be made either directly on the communication device or from a remote location. In addition, the illustrative embodiments provide the ability to set settings based on a user profile that takes into account one or more user characteristics.

The illustrative embodiments described herein provide a computer-implemented method, apparatus, and computer program product for customizing settings in a communication device for a user. In one illustrative embodiment, the process identifies a user profile to which a user belongs. In one example, the process may identify the user profile to which the user belongs based on one or more characteristics of the user. Also, the identification of the user profile to which a user belongs may be based on a user selection. The user selection may indicate the user profile, or may indicate characteristics of the user that may be used to identify the user profile of the user.

In some cases, a user may belong to two or more user profiles based on that user's characteristics. In this case, the process may identify a hybrid user profile to which the user belongs based on at least two characteristics of the user. A hybrid user profile is a user profile that includes elements of two or more other user profiles.

The process identifies a set of custom communication device settings associated with the user profile or hybrid user profile. The set of custom communication device settings may be a user-defined set of custom communication device settings.

The process also sets a current set of communication device settings for a set of functions in a communication device to the set of custom communication device settings. In one example, setting the current set of communication device settings for the set of functions in the communication device to the set of custom communication device settings includes changing the current set of communication device settings for the set of functions in the communication device to the set of custom communication device settings in response to determining that the current set of communication device settings do not match the set of custom communication device settings The principles of the present invention can take the form of an entirely hardware embodiment, an entirely software embodiment or an embodiment containing both hardware and software elements. In one embodiment, the invention is implemented in software, which includes but is not limited to firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code may include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, and pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for customizing settings in a communication device for a user with a disability, the method comprising:
   identifying a disability of the user, the disability being irrespective of age;
   identifying, using a microprocessor, a user profile comprising a set of custom communication device settings associated with the disability of the user from a user profile settings management system, wherein the user profile settings management system is stored in the communication device and manages a plurality of user profiles, wherein the user profile is a hybrid profile that comprises elements of two or more other user profiles; and
   setting, without user interaction, a current set of communication device settings for a set of functions in the communication device to the set of custom communication device settings associated with the disability of the user, wherein the set of custom communication device settings assists the user with the disability in using the communication device.

2. The method of claim 1, wherein the disability includes hearing impairment.

3. The method of claim 2, wherein the set of custom communication device settings associated with the disability includes adjusting a ringer volume of the communication device.

4. The method of claim 2, wherein the set of custom communication device settings associated with the disability includes adjusting a speaker volume of the communication device.

5. The method of claim 1, wherein the disability includes vision impairment.

6. The method of claim 5, wherein the set of custom communication device settings associated with the disability includes adjusting a font size on a display of the communication device.

7. The method of claim 5, wherein the set of custom communication device settings associated with the disability includes adjusting a backlight duration the communication device.

8. The method of claim 1, wherein the disability includes a physical deformity.

9. The method of claim 8, wherein the set of custom communication device settings associated with the disability includes adjusting a call answer mode of the communication device.

10. The method of claim 8, wherein the set of custom communication device settings associated with the disability includes adjusting a key selection mode of the communication device.

11. A data processing system comprising:
a bus system;
a memory connected to the bus system, wherein the memory includes a set of instructions; and
a processing unit connected to the bus system, wherein the processing unit executes the set of instructions to:
receive an identification of a type of disability of a user, the type of disability being irrespective of age;
identify, using a microprocessor, a user profile comprising a set of custom communication device settings associated with the type of disability of the user from a user profile settings management system, wherein the user profile settings management system is stored in the communication device and manages a plurality of user profiles, wherein the user profile is a hybrid profile that comprises elements of two or more other user profiles; and
set, without user interaction, a current set of communication device settings for a set of functions in a communication device to the set of custom communication device settings associated with the disability of the user wherein the set of custom communication device settings assists the user with the disability in using the communication device.

12. The data processing system of claim 11, wherein the disability includes hearing impairment.

13. The data processing system of claim 12, wherein the set of custom communication device settings associated with the disability includes adjusting a ringer volume of the communication device.

14. The data processing system of claim 12, wherein the set of custom communication device settings associated with the disability includes adjusting a speaker volume of the communication device.

15. The data processing system of claim 11, wherein the disability includes vision impairment.

16. The data processing system of claim 15, wherein the set of custom communication device settings associated with the disability includes adjusting a font size on a display of the communication device.

17. The data processing system of claim 15, wherein the set of custom communication device settings associated with the disability includes adjusting a backlight duration the communication device.

18. The data processing system of claim 11, wherein the disability includes a physical deformity.

19. The data processing system of claim 18, wherein the set of custom communication device settings associated with the disability includes adjusting a call answer mode of the communication device.

20. The data processing system of claim 18, wherein the set of custom communication device settings associated with the disability includes adjusting a key selection mode of the communication device.

21. A communication device comprising:
a bus system;
a memory connected to the bus system, wherein the memory includes a set of instructions;
and
a processing unit connected to the bus system, wherein the processing unit executes the set of instructions to:
receive an identification of a disability of a user, the disability being irrespective of age;
identify, using a microprocessor, user profile comprising a set of custom communication device settings associated with the disability of the user from a user profile settings management system, wherein the user profile settings management system is stored in the communication device and manages a plurality of user profiles, wherein the user profile is a hybrid profile that comprises elements of two or more other user profiles; and
set, without user interaction, a current set of communication device settings for a set of functions in the communication device to the set of custom communication device settings associated with the disability of the user, wherein the set of custom communication device settings assists the user with the disability in using the communication device.

* * * * *